T. KINGSFORD.

Apparatus for the Manufacture of Starch.

No. 141,442.  Patented August 5, 1873.

Attest,
F. W. Howard
L. H. Trook

Inventor,
Thomson Kingsford
By his Attorney
Chas. F. Stansbury

UNITED STATES PATENT OFFICE.

THOMSON KINGSFORD, OF OSWEGO, NEW YORK.

IMPROVEMENT IN APPARATUS FOR THE MANUFACTURE OF STARCH.

Specification forming part of Letters Patent No. 141,442, dated August 5, 1873; application filed July 15, 1873.

*To all whom it may concern:*

Be it known that I, THOMSON KINGSFORD, of the city and county of Oswego and State of New York, have invented an Improvement in Drying Apparatus used in the Manufacture of Starch; and I do hereby declare the following to be a full and correct description of the same, reference being had to the accompanying drawings, in which—

Figure 1:
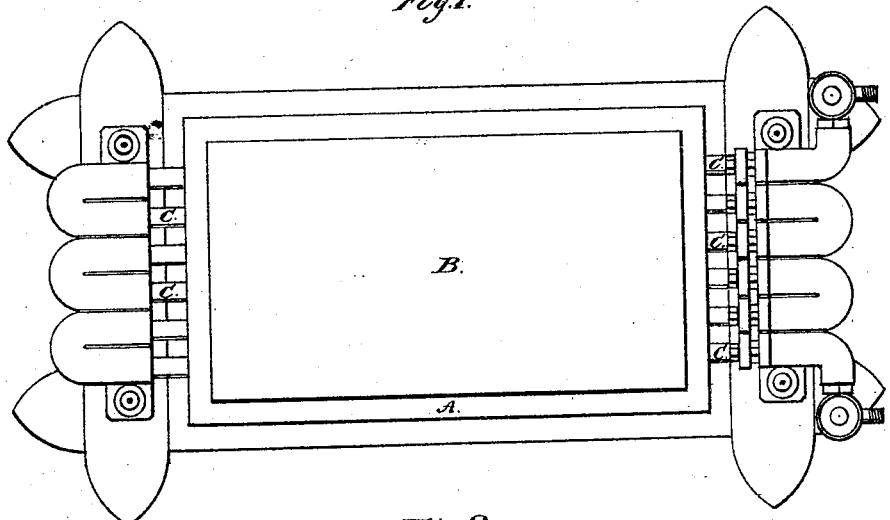
Figure 2:
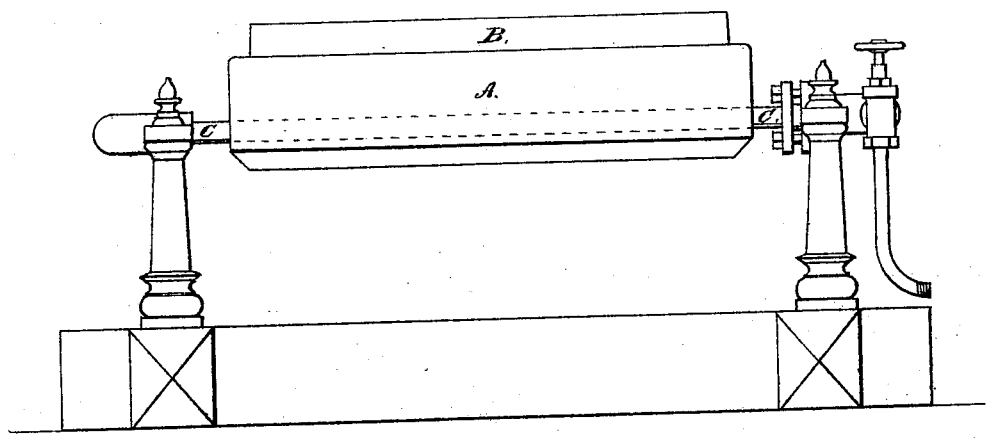
Figure 3:
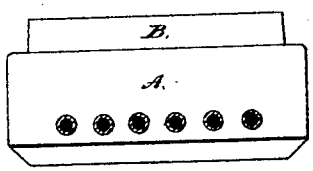
Figure 4:
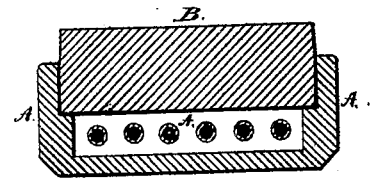

Figure 1 is a plan or top view of the apparatus. Fig. 2 is a side elevation. Fig. 3 is an end view of the frame and tile. Fig. 4 is a vertical transverse section of the same.

Similar letters of reference indicate corresponding parts in the several figures.

A is a trough-like frame made of wood. It may or may not be lined with iron, or any other suitable material as preferred. B is a stationary tile, made of plaster of Paris, gypsum, or any suitable material or combination of materials of an absorbent nature. C C, &c., are steam-pipes for heating and drying the tile. I do not, however, confine myself to the use of steam for this purpose. Hot air or hot water may be used in the pipes, or hot air may be employed without the use of pipes.

My apparatus is used in the manufacture of starch for the purpose of drying the starch as soon as it is broken into lumps. The damp starch is placed on the porous table B, which abstracts its moisture by absorption. The water withdrawn from the starch is drawn down and driven off from the absorbent slab by heat applied below by means of steam-pipes or otherwise.

Heretofore starch-makers have been accustomed to use soft or half-burnt bricks for this purpose. By the ordinary process the lumps of damp starch are placed on the bricks, which, on account of their absorbent nature, abstract a portion of the water from the starch. After the starch is removed from the bricks the latter must be placed in an oven and dried before they are fit to be used the second time. This operation is tedious and expensive as well as unhealthful, because the operatives are exposed to the great heat of the oven and to the bad effects of inhaling brick-dust.

By my improved apparatus the expense of carrying the bricks to and from the oven is saved. My apparatus is stationary and the absorbent material is constantly being dried by means of the steam or hot air applied below it, as described.

Having thus fully described my invention, what I claim, and desire to secure by Letters Patent, is—

A starch-drying apparatus, consisting of an absorbent slab or table, which receives the starch to be dried and abstracts its moisture by absorption, said slab or table being itself dried by artificial heat applied to its lower surface, in the manner set forth.

The above specification of my said invention signed and witnessed at Oswego this 30th day of June, A. D. 1873.

THOMSON KINGSFORD.

Witnesses:
 RALPH HOWE,
 GEO. NOYES BURT.